United States Patent [19]

Melwisch

[11] 4,152,733
[45] May 1, 1979

[54] PLAYBACK APPARATUS

[75] Inventor: Harald Melwisch, Vienna, Austria

[73] Assignee: U.S. Philips Corporation, New York, N.Y.

[21] Appl. No.: 815,940

[22] Filed: Jul. 15, 1977

[30] Foreign Application Priority Data

Aug. 5, 1976 [AT] Austria .................................. 5821/76

[51] Int. Cl.² .......................... G11B 5/45; H03K 5/08
[52] U.S. Cl. ...................................... 360/65; 307/237; 360/30
[58] Field of Search ........................ 360/65, 30, 67, 33; 307/237; 328/171; 325/46

[56] References Cited

U.S. PATENT DOCUMENTS

| 3,098,937 | 7/1963 | Martens | 307/237 |
| 3,163,826 | 12/1964 | Kemper | 307/273 |
| 3,278,866 | 10/1966 | Bose | 307/237 |
| 3,288,930 | 11/1966 | Johnson | 325/46 |
| 3,340,367 | 9/1967 | Coleman, Jr. et al. | 360/65 |
| 3,390,341 | 6/1968 | Kline | 307/237 |
| 3,436,490 | 4/1969 | Roelofs | 360/65 |
| 3,524,081 | 8/1970 | Camponellz | 307/237 |
| 3,582,680 | 6/1971 | Slavin | 325/46 |
| 3,944,853 | 3/1976 | Cooper | 360/67 |

FOREIGN PATENT DOCUMENTS 1284349  8/1972  United Kingdom ..................... 307/237

OTHER PUBLICATIONS

"Pulse, Digital & Switching Waveforms" by Millman & Taub, sec. 7.8, McGraw Hill Book Co., ©1965.

Primary Examiner—Vincent P. Canney
Attorney, Agent, or Firm—Thomas A. Briody; William J. Streeter; Simon L. Cohen

[57] ABSTRACT

A playback apparatus for a recorded frequency modulated television signal includes a filter between the record carrier pick-up heads and the limiter-demodulator. The filter characteristics increase the ratio of the carrier signal frequency to the lower side band frequencies in response to a drop in carrier amplitude.

4 Claims, 9 Drawing Figures

PLAYBACK APPARATUS

The invention relates to a playback apparatus for a record carrier on which a signal is recorded. The signal is preferably a television signal which is frequency-modulated on a carrier signal. The apparatus comprises a transducer arrangement for scanning the record carrier, whose output signal, which consists of a frequency-modulated signal with a carrier and at least the lower side band, is applied to a limiter and demodulator for the detection of the signal. In such equipment the output signal of the transducer arrangement may exhibit comparatively large amplitude fluctuations, when said arrangement does not exactly scan the record carrier. In the case of a transducer arrangement comprising magnetic heads, this may for example be the case when the record carrier is lifted off the magnetic heads. A slight lift of less than 1 μm results in a substantial decrease in the amplitude of the output signal, approximately of the order of magnitude of 15 dB, because this influence obeys an exponential law. During the reproduction of a television signal it is found that the occurrence of such a disturbance gives rise to noise and black smears in the picture, although before the demodulation the reproduced signal is applied to a limiter, which maintains the amplitude of the actual carrier signal constant.

It is an object of the invention to eliminate these problems in a simple manner. To achieve this, in accordance with the invention, at least one filter is included before the limiter and the demodulator, whose transfer function is variable depending on the amplitude of the carrier signal, the amplitude of the carrier signal, when it decreases, being boosted relative to the amplitudes of the signal components in the lower side band. Thus, if the amplitude of the carrier signal decreases the frequency response is adjusted so that the amplitudes of the signal components in the lower side band relative to the amplitude of the carrier signal, or vice versa, are changed so that substantially the same situation is obtained as in the absence of a disturbance. The influence of such a disturbance depends on the frequency of the reproduced signal and increases at higher frequencies, even to such an extent that the amplitudes of the signal components in the lower side band become greater than the amplitude of the carrier signal, in which cases the limiter and the demodulator no longer operate correctly. By influencing the frequency response in accordance with the invention depending on the amplitude of the carrier signal such frequency dependent disturbances are eliminated and the limiter and modulator again receive a signal which they can process correctly.

A particularly simple circuit arrangement is obtained when a high-pass filter is provided, which is constituted by half a T-network, of which one branch includes an ohmic resistance and whose other branch includes an impedance, which is connected in parallel with at least one circuit element whose impedance varies directly as a function of the amplitude of the carrier signal appearing across it, said impedance decreasing at increasing amplitude.

It is also found to be advantageous when, a low-pass filter constituted by a series tuned circuit is provided, of which one circuit element is connected in parallel with at least one further circuit element whose impedance is variable depending on the amplitude of the carrier signal, said impedance decreasing at increasing amplitude. In this way very large frequency dependent amplitude variations can also be compensated for in a simple manner.

It is also found to be advantageous when the filter comprises one channel without signal delay and at least one further channel with a signal delay provided by a delay network. The output signals of the channels are combined with each other. In at least one channel a circuit element whose impedance is variable depending on the amplitude of the carrier signal is included. By the use of such a filter hardly any envelope delay distortion occurs owing to the change of the transfer function of the filter.

The invention will be described in more detail with reference to the drawings which show some embodiments of the invention, but to which the invention is not limited.

Figure 1:
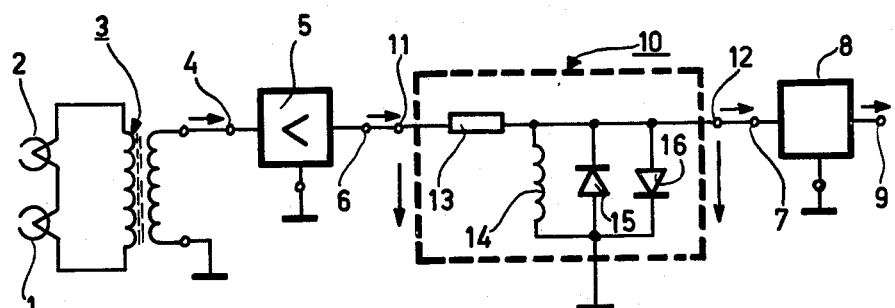
FIG. 1 is a block diagram of a first embodiment of the invention.
Figure 3:
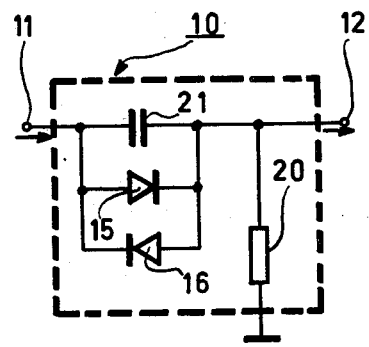
Figure 4:
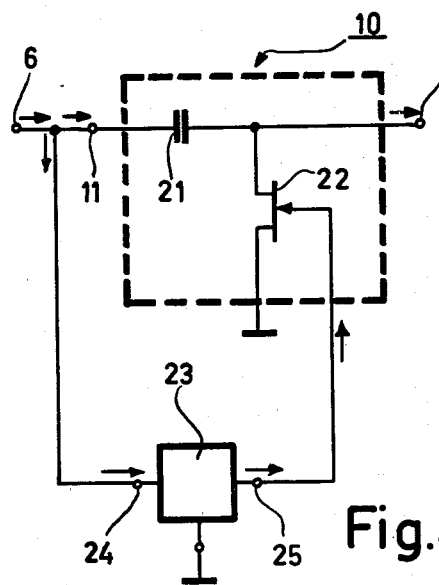
Figure 5:
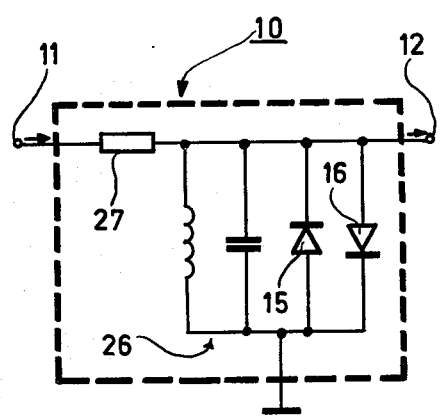
Figure 6:
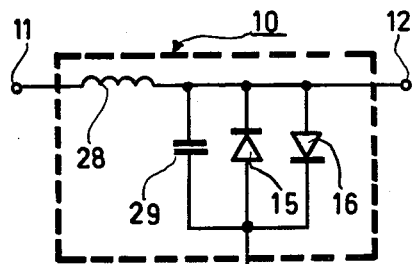
Figure 7:
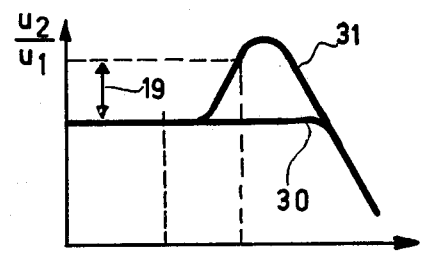
Figure 8:
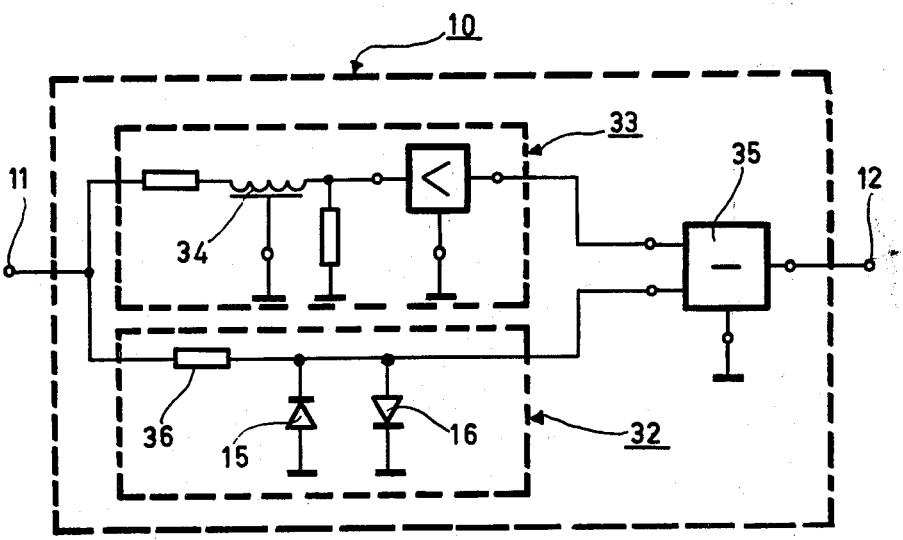
Figure 9:
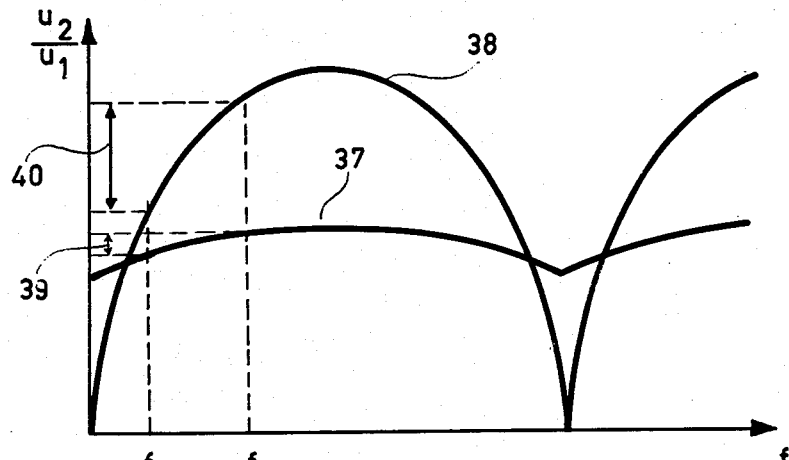

FIG. 3 shows a second embodiment using a high-pass filter, which is the reciprocal of the filter used in the embodiment of FIG. 1, FIG. 4 shows a third embodiment of the filter is variable depending on the of the invention, FIG. 5 shows a fourth embodiment using parallel tuned circuit, FIG. 6 shows a fifth embodiment using a series tuned circuit, FIG. 7 is a diagram which shows the variation of the transfer function of the filter of FIG. 6 depending on the amplitude of the carrier signal, FIG. 8 shows a sixth embodiment using a delay network, and FIG. 9 is a diagram which shows the variation of the transfer function of the filter of FIG. 8 depending on the amplitude of the carrier signal.

FIG. 1 the reference numerals 1 and 2 designate the magnetic heads of a transducer arrangement for scanning a record carrier in a playback apparatus. The output signals of these magnetic heads are applied to the input 4 of an amplifier 5 via a transformer 3. As in common practice, the signal recorded on the record carrier, which in the present instants is a televison signal, is impressed on a carrier signal as a frequency modulation. Thus, at the output 6 of the amplifier 5 in the playback apparatus a signal is available which consists of a frequency-modulated signal with a carrier and at least the lower side band. This frequency modulated signal is normally applied to the input 7 of a limiter and demodulator 8 for demodulating the signal, which signal is then available at the output 9 of said demodulator. The limiter then in known manner ensures that the amplitude of the actual carrier signal is maintained constant, so that the advantages associated with frequency modulation systems are retained.

If during scanning of the record carrier the magnetic heads 1 and 2 of the transducer arrangement are even slightly lifted off the record carrier, or the other way round, for example in the order of magnitude of 1 μm, this results in a substantial drop-in amplitude of the output signals of the magnetic heads. However, such a decrease of the amplitude, does not only depend on the clearance formed between the magnetic head and the record carrier. To a much greater extent it also depends on the instantaneous frequency of the reproduced signal, signals of a higher frequency being further reduced than low frequency signals. In the present instance such a disturbance results in the amplitude of the carrier signal being reduced further than the amplitude of the signal components in the lower side band, which may for example lead to amplitude differences of the order of magnitude of 20 dB. If such a disturbed signal is applied to the limiter and demodulator, the noise in the demodulated signal becomes more conspicuous, because the signal components in the lower side band are boosted more strongly at a low amplitude of the carrier signal. Moreover, it may happen that the amplitudes of the signal components in the lower side band become higher than the amplitude of the carrier signal, as a result of which the limiter and the modulator can no longer operate correctly, so that a signal is produced which does not correspond to the actual picture contents, which for example results in smears at transients in the reproduced televison picture.

In order to avoid such problems at least one filter 10 is included in the signal path between the output 6 of the amplifier 5 and the input 7 of the limiter and demodulator 8, whose transfer function is variable depending on the amplitude of the carrier signal, the carrier signal being boosted relative to the amplitudes of the signal components in the lower side band when the amplitude of the carrier signal decreases. In the present example a high-pass filter is used, whose input is designated 11 and whose output is designated 12. This high-pass filter consists of a half T-network of which one branch comprises an ohmic resistance 13 and whose other branch includes an impedance 14 which is constituted by an inductance. Two opposed diodes 15 and 16 are connected in parallel with this impedance 14. The diodes function as a circuit element whose impedance changes directly as a function of the amplitude of the carrier signal appearing across them, the impedance decreasing at increasing amplitude. Thus, a separate control circuit for changing the impedance of the circuit elements may be dispensed with.

Figure 2:
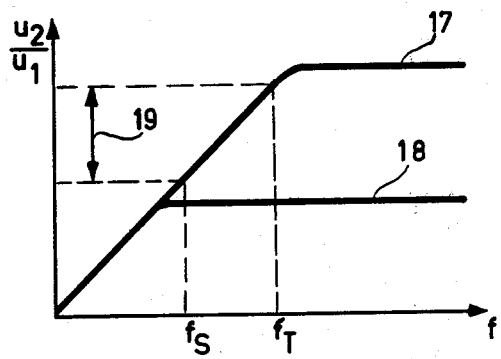
FIG. 2 is a diagram which shows the variation of the transfer function of the filter used in the embodiment of FIG. 1. depending on the amplitude of the carrier signal.

FIG. 2 represents the transfer functions of this high-pass filter for a low and a high amplitude of the carrier signal, the frequency f being plotted on the horizontal axis and the amplitude ratio between the output signal $u_2$ and the input signal $u_1$ of the filter of the vertical axis. For a low amplitude of the carrier signal the circuit elements 15 and 16 present a high impedance, so that the transfer function designated 17 is obtained. If, however, the amplitude of the carrier signal is high, the circuit elements 15 and 16 present a low impedance, as a result of which the cut-off frequency of the high-pass filter is now shifted towards lower frequencies and the transfer function designated 18 is obtained. For low amplitudes of the carrier signal the cut-off frequency of the high-pass filter has been selected so that it is situated in the frequency range of the carrier signal, which in FIG. 2 is represented by the dashed line near $f_T$. The essential signal components in the lower side band are situated at lower frequencies, as is schematically indicated by the dashed line near $f_S$. Owing to the action of the circuit elements 15 and 16 the cut-off frequency of the high-pass filter at high amplitudes of the carrier signal consequently lies below the frequencies of the signal components in the lower side band.

As can be seen from the transfer function 18 of the high-pass filter, both carrier signal and the signal components in the lower side band are transferred by the high-pass filter in an identical manner when the magnetic heads co-operate correctly with the record carrier and consequently the carrier amplitude is high. In the case of a disturbance for which the amplitude of the carrier signal decreases, the transfer function 17 of the high-pass filter becomes effective, as a result of which the amplitude of the carrier signal is boosted relative to the amplitudes of the signal components in the lower side band, namely by an amount as indicated by the double arrow 19 in FIG. 2. Thus the greater reduction in carrier amplitude relative to the amplitude of the signal components as a result of the disturbance is compensated for again. By thus influencing the frequency response of the frequency-modulated signal depending on the amplitude of the carrier signal, it is ensured that also in the case of a reduction in amplitude of the carrier signal owing to a disturbance as described hereinbefore signal-relationships are obtained which substantially correspond to the situation in the absence of a disturbance and which guarantee a correct operation of the limiter and demodulator.

As appears from the foregoing, the filter circuit which is used has a very simple circuit arrangement, in particular because for influencing the transfer function depending on the amplitude two opposed diodes connected in parallel are employed, whose impedance changes directly depending on the amplitude of the signal appearing across them. It is evident that these diodes may also be replaced by another circuit element whose impedance is variable in a similar way, for example by a controlled field-effect transistor. Obviously, it is alternatively possible to connect a plurality of such high-pass filters after each other, when larger amplitude differences are to be compensated for. In a similar way the parallel diodes 15 and 16 may also be connected in parallel with the resistor 13.

Example of such a high-pass filter is shown in FIG. 3, whose circuit arrangement is the reciprocal of the filter in accordance with the embodiment of FIG. 1. This filter 10 is again constituted by half a T-network, of which one branch comprises an ohmic resistance 20 and whose other branch comprises an impedance 21 which is constituted by a capacitor, said capacitor being connected to the input 11 of the filter 10. The two opposed parallel diodes 15 and 16 are now connected in parallel with the impedance 21. The operation of this filter in respect of the variation of the transfer function depending on the amplitude of a carrier signal is similar to that of the example of FIG. 1, the amplitude of the signal components in the lower side band now being attenuated more strongly at a low amplitude of the carrier signal than for a high amplitude of the carrier signal.

The filter of FIG. 4 is again a high-pass filter which consists of half a T-network and whose branch which is connected to the input 11 of the filter 10 includes a capacitor 21. However, in the other branch the ohmic resistance is replaced by a variable impedance, which is constituted by a field-effect transistor 22 which can be controlled by the output circuit. For controlling this field-effect transistor an amplitude detector 23 is provided, to whose input 24 the reproduced frequency-modulated signals appearing at the output 6 of the amplifier 5, not shown, are applied. The output 25 of the amplitude detector 23 is connected to the gate electrode of the field-effect transistor 22. The field-effect transistor is controlled in such a way that at a high amplitude of the carrier signal its output impedance increases, so that the cut-off frequency of the filter is reduced, while for a low amplitude of the carrier signal its output impedance decreases and the cut-off frequency of the filter consequently increases. In this way the filter 10 again yields transfer functions which are variable depending on the amplitude of the carrier signal, as shown in FIG. 2.

The filter 10 shown in FIG. 5 consists of a parallel resonant circuit 26 which is tuned to the carrier frequency, which filter is driven via a resistor 27. Parallel to the tuned circuit 26 diodes 15 and 16, which are connected in parallel, are connected in a similar way as in the examples of FIGS. 1 and 3. At a high amplitude of the carrier signal these diodes 15 and 16 present a low impedance, which strongly damps the parallel tuned circuit 26, so that its resonant rise has substantially no effect. However, in the case of a low amplitude of the carrier signal the diodes 15 and 16, present a high impedance, which no longer damps the parallel tuned circuit 26 significantly, so that its resonant rise now has the full effect, as a result of which the carrier signal is boosted relative to the signal components in the lower side band. Thus, the frequency response of the reproduced frequency modulated signal which is applied to the filter is again influenced depending on the amplitude of the carrier signal.

The example of FIG. 6 shows a filter 10, which takes the form of a low-pass filter, consisting of a series tuned circuit which is tuned to a frequency higher than that of the carrier signal, which with an inductance 28 and a capacitor 29 constitutes half a T-network. Parallel to the capacitor 29 opposed parallel diodes 15 and 16 are included but these diodes may also be connected in parallel with the inductance.

FIG. 7 shows the transfer functions of this filter as a function of the amplitude of the carrier signal, the transfer function which is designated 30 being obtained at a high amplitude of the carrier signal and that designated 31 at a low amplitude of the carrier signal, in accordance with the impedances presented by the opposed parallel diode 15 and 16 depending on the amplitude of the signal appearing directly across them. Thus, when the amplitude of the carrier signal is low, said signal is again boosted relative to the amplitudes of the signal components in the lower side band, as is indicated by the double arrow 19 in FIG. 7. Such a filter enables large relative amplitude variations to be compensated for in a simple manner. This effect becomes more pronounced as the resonant frequency of the series tuned circuit approximates to the frequency of the carrier signal and as the quality of the tuned circuit increases.

For use in accordance with the invention a filter 10 as is shown in FIG. 8 may also be used to advantage, which filter is designated a delay network or, in a special form, a comb filter. Said filter comprises a channel 32 without signal delay and a further channel 33 with a signal delay caused by a delay network 34. The output signals of the two channels are combined with each other in a circuit arrangement 35. In the present case this is effected by a differential amplifier. In channel 32, which transfers the signal without delay, steps have been taken to influence the amplitude of this signal depending on the amplitude of the carrier signal. For this purpose a voltage divider is provided, consisting of a resistor 36 and two anti-parallel diodes 15 and 16, whose division ratio depends on the amplitudes of the signals directly across the diodes 15 and 16. Obviously, these steps for influencing the amplitude of the signal to be transmitted in a channel, may also be applied to the channel 33 instead of the channel 32. Similarly, in analogy to the example of FIG. 4 the anti-parallel diodes may be replaced by an impedance, for example a field-effect transistor, which is controlled by an amplitude detector.

FIG. 9 shows the transfer functions of such a filter, which are variable depending on the amplitude of a carrier signal. The transfer function designated 37 is then valid for a high amplitude of the carrier signal and the transfer function designated 38 for a low amplitude of the carrier signal. As can be seen, at a high amplitude of the carrier signal this carrier signal in accordance with the transfer function 37 bears a specific ratio to the amplitudes of the signal components in the lower side band, as is indicated by the double arrow 39. For a low amplitude of the carrier signal said ratio is different, in accordance with the transfer function 38, as indicated by the double arrow 40. Since the ratio of the amplitude of the carrier signal of the amplitudes of the signal components in the lower side band for a low amplitude of a carrier signal is essentially greater than that for a high amplitude of the carrier signal, the amplitude of the carrier signal in the first-mentioned case is boosted relative to the amplitudes of the signal components in the lower side band.

Thus, it is again ensured that at decreasing amplitude of the carrier signal the frequency response of the reproduced frequency-modulated signal is again influenced in such a way that this signal can be processed correctly in the limiter and modulator. Such a filter is particularly suitable because it introduces hardly any group delay distortion. Such filters can moreover be realized with a wide variety of transfer functions, depending on the number of channels introducing a delay for the signals, or on how the delay networks are dimensioned and in which way the output signals of the channels are combined with each other, either by addition or subtraction.

What is claimed is:

1. A playback apparatus for a record carrier on which a signal frequency-modulated on a carrier is recorded, said apparatus comprising a transducer means for scanning the record carrier and for providing an output signal consisting of a frequency modulated signal with a carrier and at least the lower side band, a limiter and demodulator means for demodulating the signal, and carrier signal controlled filter means connecting the transducer means to the limiter and demodulator means for increasing the amplitude of the carrier signal relative to the amplitudes of the signal components in the lower side band in response to a decrease in the amplitude of the carrier signal.

2. An apparatus as claimed in claim 1, wherein the filter means is a highpass filter comprising half a T-network, of which one branch includes an ohmic resistance and whose other branch comprises a reactive impedance, and at least one circuit element whose impedance decreases as a function of the amplitude of the carrier signal appearing across it connected in parallel with said reactive impedance.

3. An apparatus as claimed in claim 1, wherein said filter means is a low-pass filter comprising a multi-element tuned circuit, and an impedance that decreases in response to increasing carrier signal amplitude connected in parallel with at least one element of said tuned circuit.

4. An apparatus as claimed in claim 1, wherein the filter means comprises a first channel means for passing said carrier signal, a further channel means for delaying the carrier signals passing therethrough with respect to the signals passing through said first channel means, means for combining the output signals of the first and the further channels, and a circuit element in one of said channels having an impedance that is variable depending on the amplitude of the carrier signal in said one of said channels.

* * * * *